United States Patent
Gweon et al.

(10) Patent No.: US 6,836,033 B2
(45) Date of Patent: Dec. 28, 2004

(54) APPARATUS FOR PRECISELY DRIVING X-Y STAGES USING VCM

(75) Inventors: Dae-Gab Gweon, Daejon (KR); Ki-Hyun Kim, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 99 days.

(21) Appl. No.: 10/340,454

(22) Filed: Jan. 10, 2003

(65) Prior Publication Data

US 2003/0132671 A1 Jul. 17, 2003

(30) Foreign Application Priority Data

Jan. 12, 2002 (KR) .................................. 10-2002-001913

(51) Int. Cl.[7] .......................... H02K 41/00; H01L 21/00
(52) U.S. Cl. .............................. 310/12; 355/53; 355/72; 33/1 M
(58) Field of Search .............................. 310/12; 355/53, 355/72; 33/1 M

(56) References Cited

U.S. PATENT DOCUMENTS 4,891,526 A * 1/1990 Reeds .................... 250/442.11
6,310,342 B1 * 10/2001 Braunstein et al. ......... 250/306

* cited by examiner

Primary Examiner—Thanh Lam
Assistant Examiner—Judson H. Jones
(74) Attorney, Agent, or Firm—Richard M. Goldberg

(57) ABSTRACT

An apparatus for precisely driving X-Y stages using and plate springs a VCM (Voice Coil Motor) performing biaxial movement in relation to a specimen transferring apparatus used in a microscope. The apparatus includes X and Y axis stages of the same structure, each of which has a part driving on both fixed sides and a part connected to the driving part by an elastic member and driving in the same direction as the driving part, and magnetic force generators connected to the stages respectively for providing the stages with driving force.

28 Claims, 19 Drawing Sheets

APPARATUS FOR PRECISELY DRIVING X-Y STAGES USING VCM

BACKGROUND OF THE INVENTION

1. Field of the Invention

The present invention relates to an apparatus for precisely driving X-Y stages using a VCM (Voice Coil Motor) precisely moving to XY axes, and more particularly, to an apparatus for precisely driving X-Y stages using a VCM and elastic member precisely moving to XY axes, magnetic force generators of which are connected to the upper portions of a stage which is movable in a direction of Y-axis and a stage which is movable in a direction of X-axis, thereby performing a biaxial movement smoothly without interference in mutual movement of stages when the stages move in a movement direction of power.

2. Background of the Related Art

In general, a PZT (Piezoelectric Transducer) is widely used as XY stages for transferring a specimen on a microscope in a micro field. However, because a movement amount of the PZT is restricted to 1 nm~10 μm, it can be amplified just up to several tens~several hundreds μm even though a structure of an amplifier is changed.

Furthermore, a system of the stage becomes complex because the amplifier structure is used. If a user wants to move to a stroke of several centimeters, a driving apparatus is needed additionally.

Moreover, if a motor and a linear guide (a ball bearing, a ball screw, or the likes) are used, there is problem in movement of a long stroke, but there is a limit in precision due to friction. At this time, the limit is about 100 nm. However, there is a movement, which falls short of the user's expectations, in a horizontal direction to a plane movement.

Next, an air bearing guide and a linear motor may be used. In this case, the PZT can move to a long region of several tens nm to several hundreds μm. However, it has a large and complex structure, and causes a vertical movement regardless to the plane movement by the air bearing so as to need an additional driving stage capable of causing the vertical movement.

SUMMARY OF THE INVENTION

Accordingly, the present invention is directed to an apparatus for precisely driving X-Y stages using a VCM (Voice Coil Motor) and elastic member that substantially obviates one or more problems due to limitations and disadvantages of the related art.

An object of the present invention is to provide an apparatus for precisely driving X-Y stages using a VCM, which does not include any movement directions different from a desired direction, has a symmetric structure stable to a thermal change, and performs biaxial movement easily.

Another object of the present invention is to provide an apparatus for precisely driving X-Y stages using a VCM, which includes X and Y axis stages of the same structure, each of which has a part driving on both fixed sides and a part connected to the driving part by an elastic member and driving in the same direction as the driving part, and magnetic force generators connected to the stages respectively for providing the stages with driving force.

In order to achieve the above objects, there is provide to an apparatus for precisely driving X-Y stages using a VCM (Voice Coil Motor) according to the present invention, comprising: (a) a frame have a bottom with a predetermined size and shape and side walls surrounding the bottom with a predetermined height; (b) a first stage movable in a first direction with respect to a horizontal plane, including: a first magnet assembly fixed to on a bottom of the frame; a first force generating unit movably connected to the first magnet assembly, wherein the first force generating unit moves in the first direction with respect to the first magnet assembly according to a first current applying thereto; and first elastic members guiding the first force generating unit to the first direction and returning its normal position, the elastic members are fixed to the first force generating unit; (c) a second stage movable in a second direction orthogonal to the first direction with respect to the horizontal plane, including: a second force generating unit fixedly installed onto the first force generating unit, where the second force generating unit is aligned to moves orthogonally to the movement direction of the first force generating unit; a second magnet assembly movably connected to the second force generating unit, the second magnet assembly moves in the second direction with respect to the second force generating unit according to a second current applying thereto; and second elastic members guiding the second force generating unit to the first direction and returning its normal position with respect to the second magnet relatively moving to the second force generating unit; and (e) a specimen transferring part fixedly installed to the second magnet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
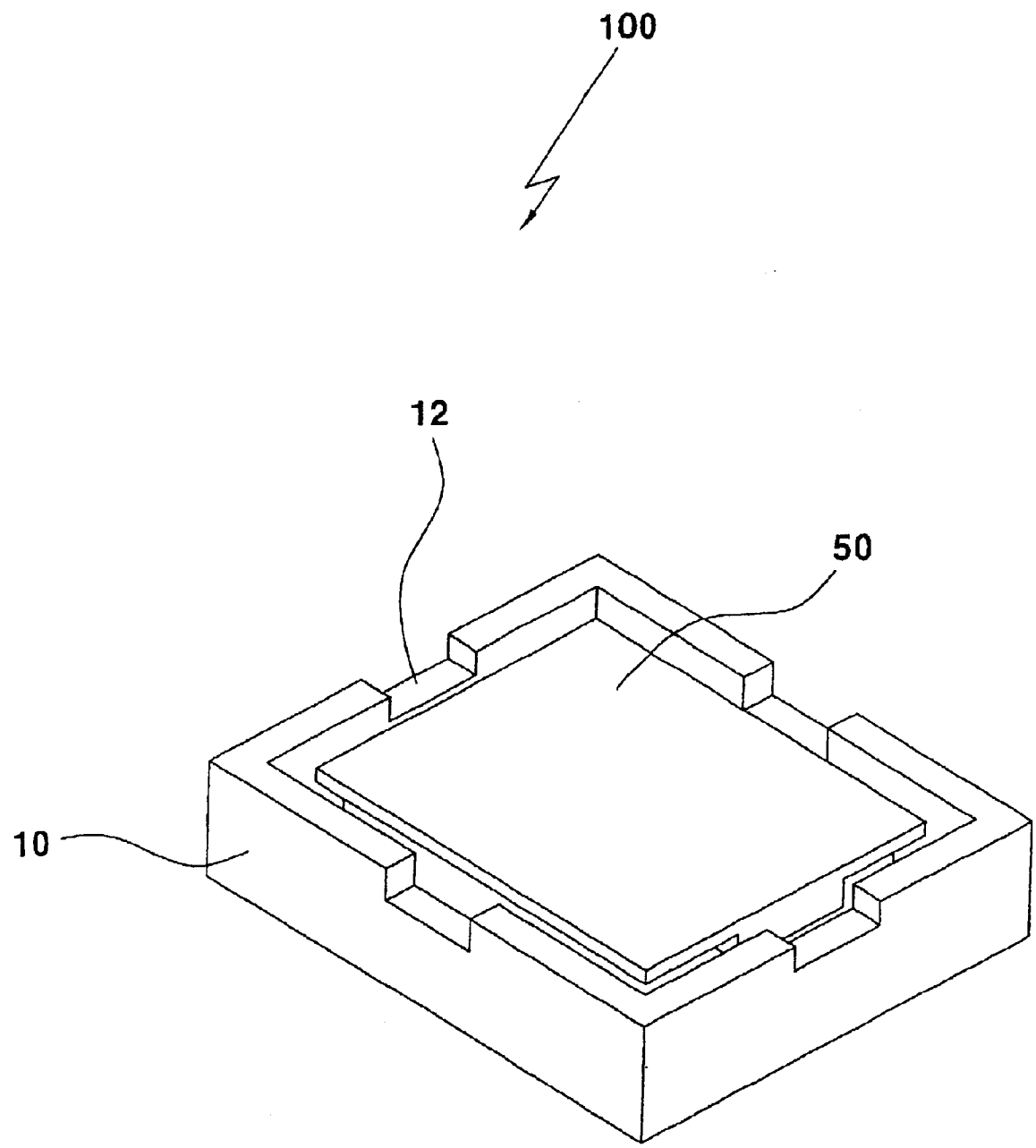
FIG. 1 is a perspective view of an apparatus for precisely driving X-Y stages using a VCM (Voice Coil Motor) according to a first preferred embodiment of the present invention.
Figure 2:
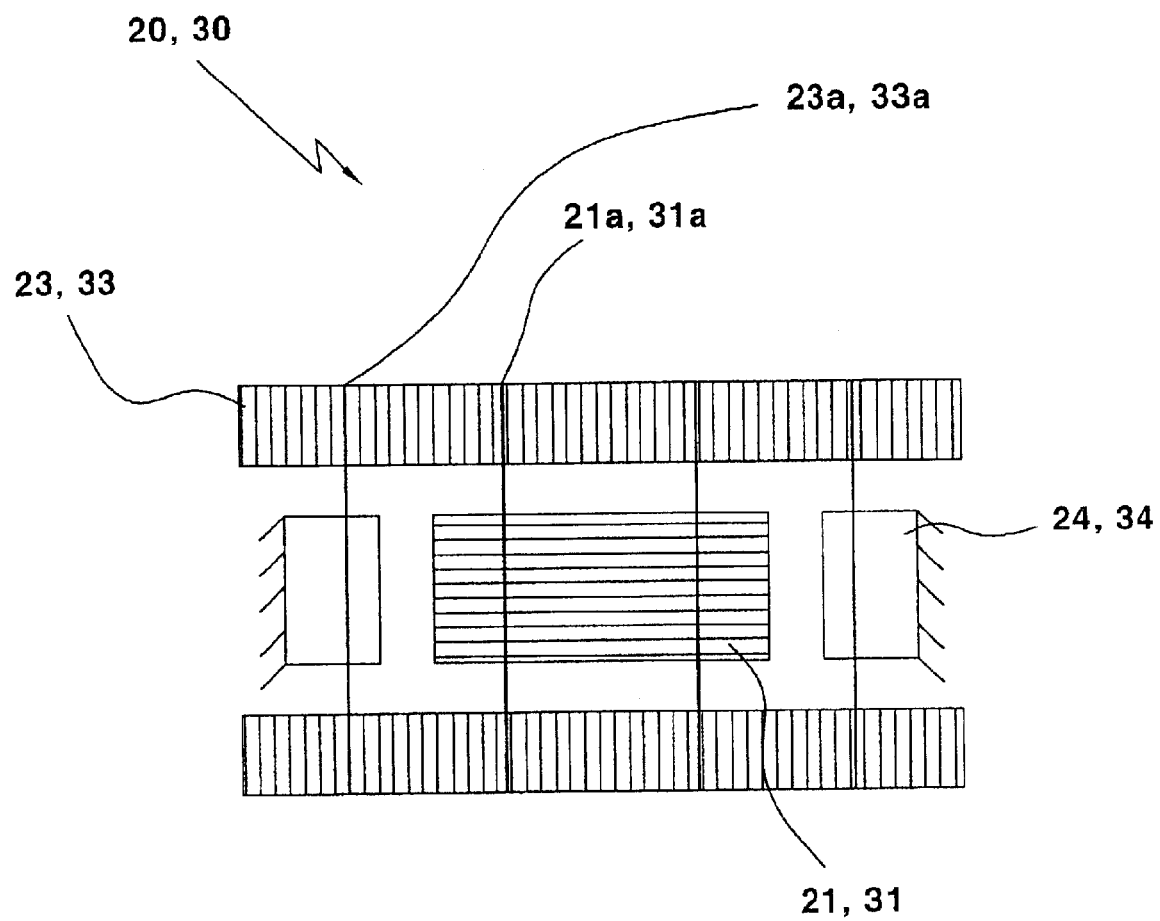
FIG. 2 is a conceptional view of an X-axis movement stage and a Y-axis movement stage according to the first preferred embodiment of the present invention.
Figure 3:
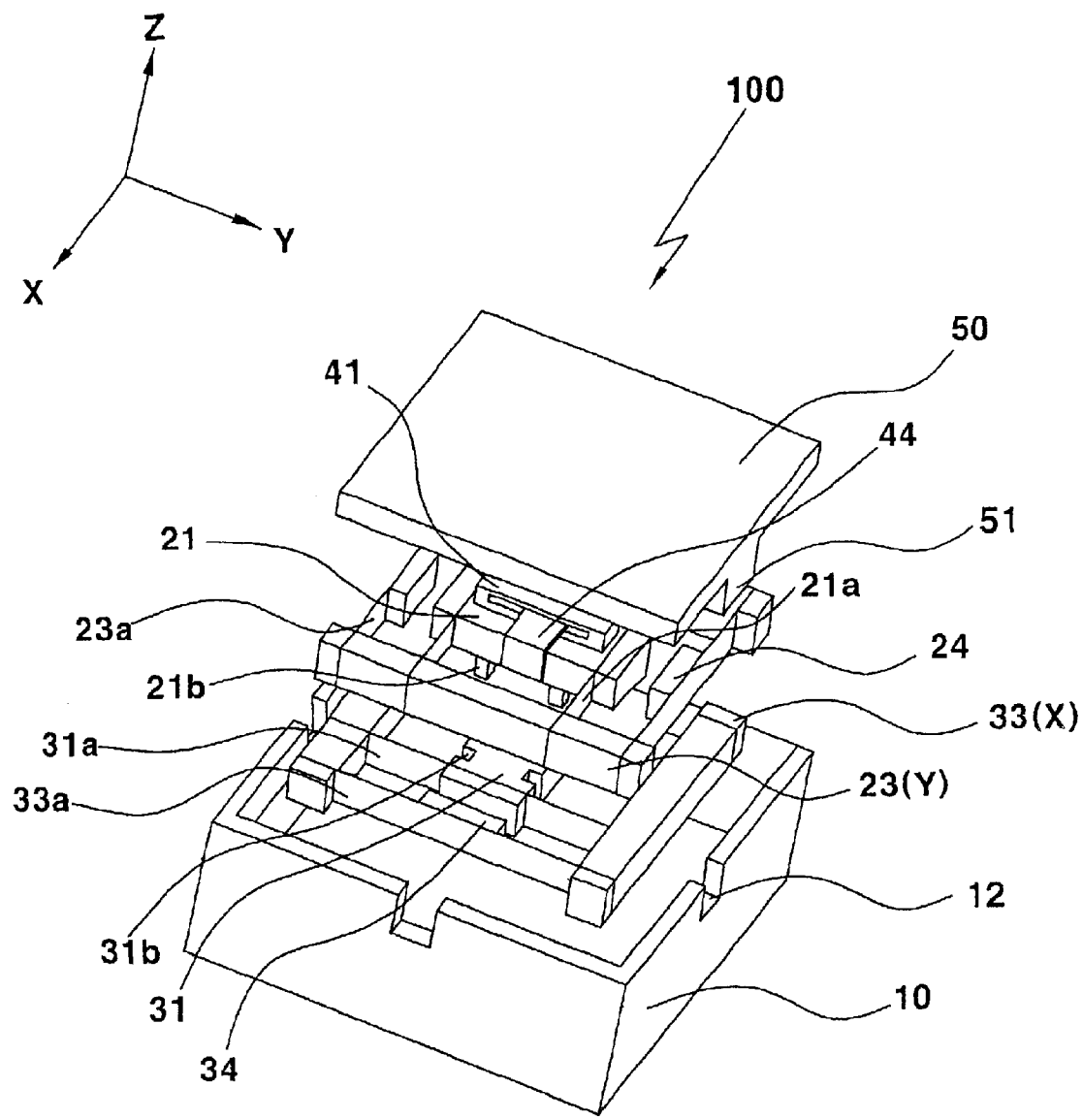
FIG. 3 is a first exploded perspective view of the apparatus for precisely driving the X-Y stages using the VCM according to the first preferred embodiment of the present invention.
Figure 4:
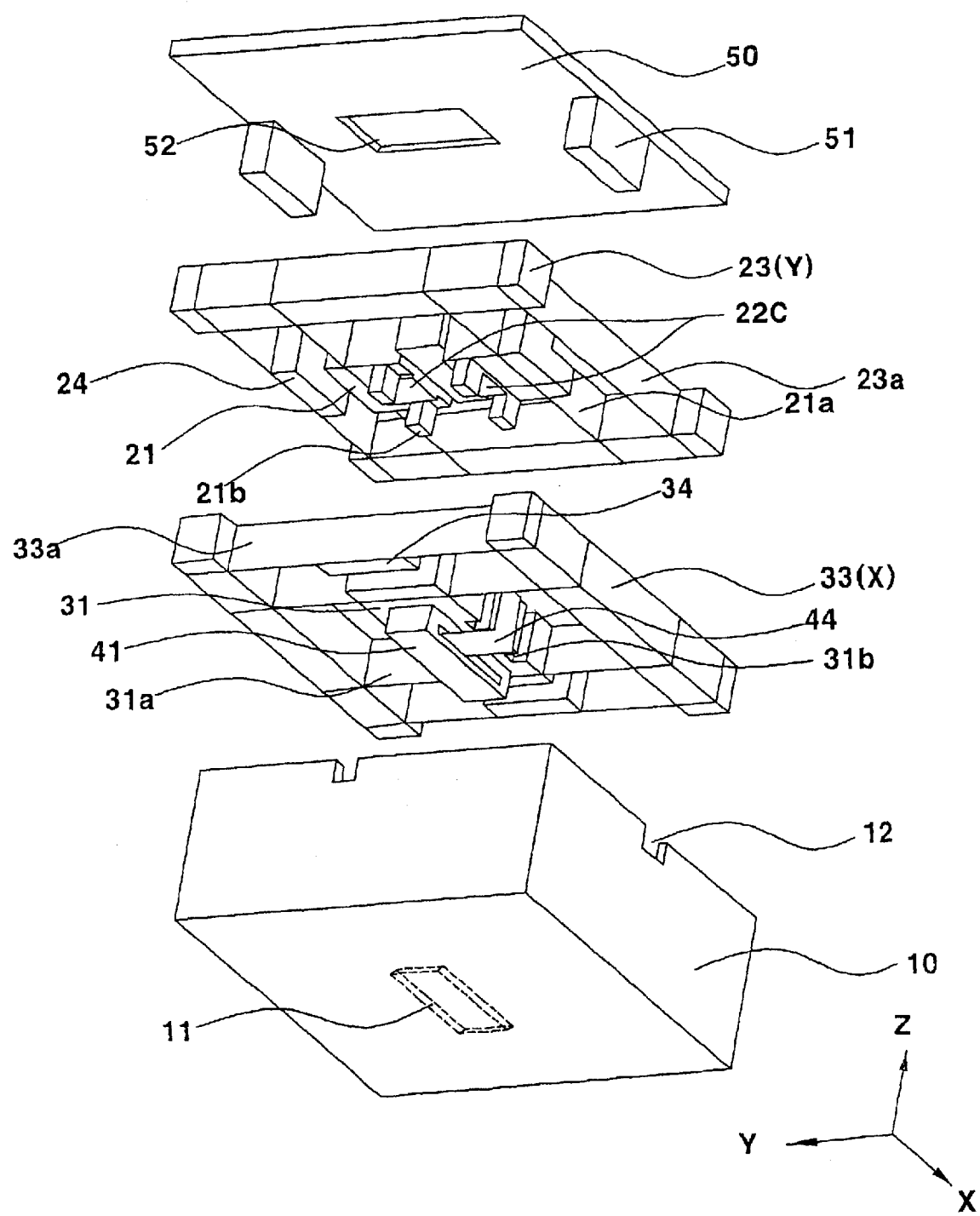
FIG. 4 is a second exploded perspective view of the apparatus for precisely driving X-Y stages using the VCM according to the first preferred embodiment of the present invention.
Figure 5:
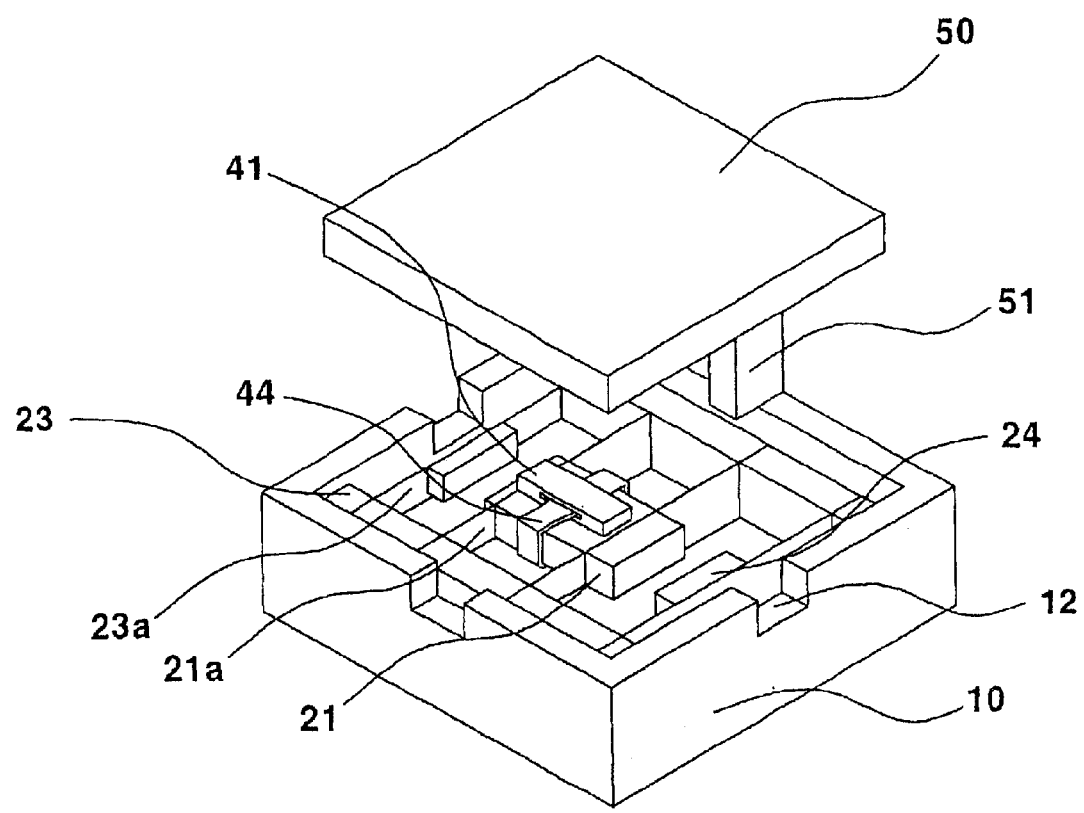
FIG. 5 is a third exploded perspective view of the apparatus for precisely driving X-Y stages using the VCM according to the first preferred embodiment of the present invention.
Figure 6:
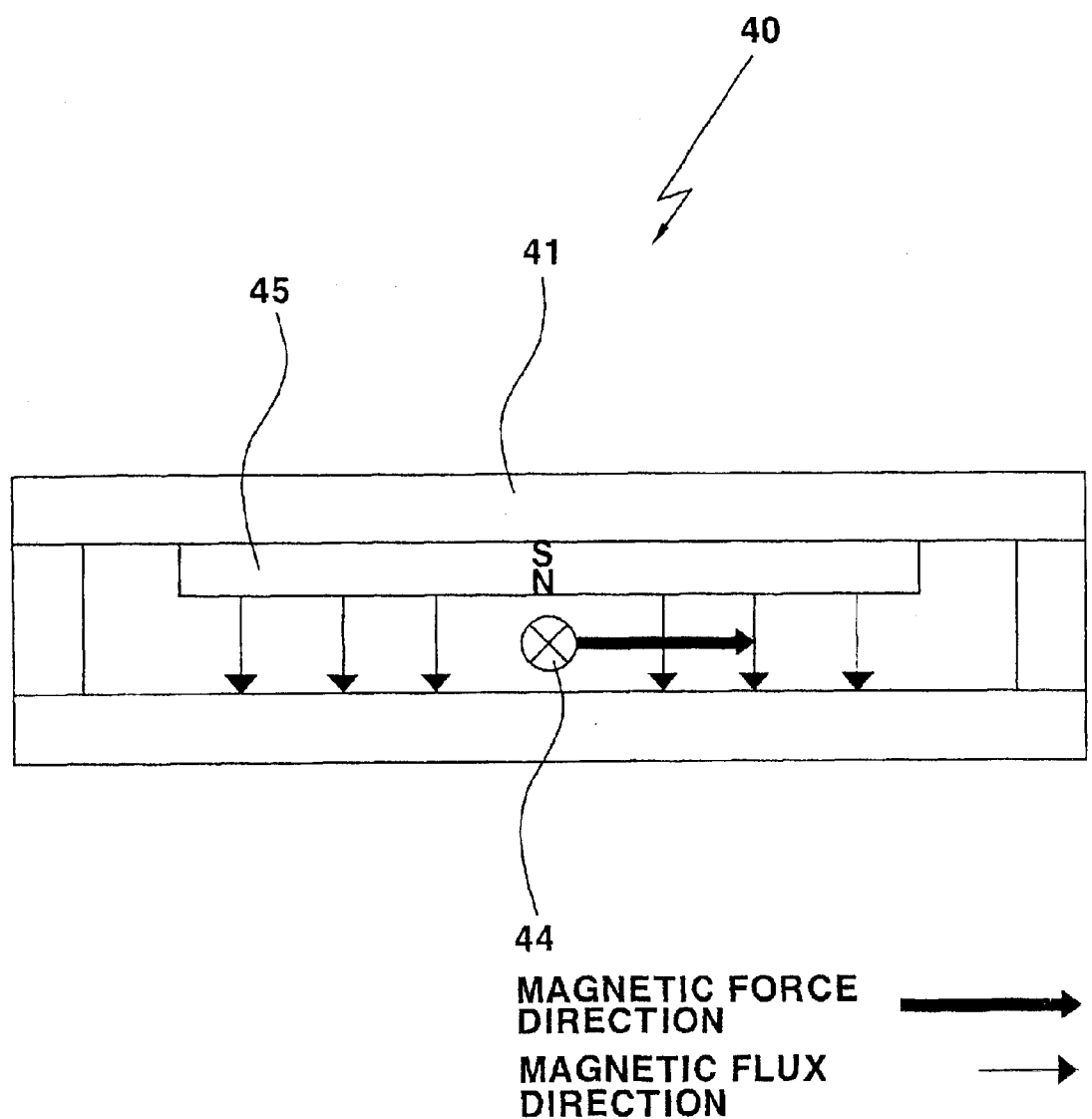
FIG. 6 is a structural view of a first magnetic force generator according to the first embodiment of the present invention.

Reference will now be made in detail to the preferred embodiments of the present invention, examples of which are illustrated in the accompanying drawings.

As shown in FIGS. 1 to 7, an apparatus 100 for precisely driving X-Y stages using a VCM (Voice Coil Motor) and elastic member includes X axis movement stage 30 and Y axis movement stage 20 of the same structure, each of which has a part driving on both fixed sides and a part connected to the driving part by an elastic member and driving in the same direction as the driving part, and magnetic force generators 40 connected to the stages 20 and 30 respectively for providing the stages 20 and 30 with driving force.

A specimen transferring part 50 supporting a specimen (not shown) is connected to the upper portion of the Y-axis movement stage 20, and the X-axis movement stage 30 is mounted inside a stage base 10 being in the form of a container. At this time, the stages 20 and 30 are laid up across each other, so that electric current is selectively applied to the magnetic force generators 40 to transfer the specimen transferring part 50 to an X-axis or a Y-axis in a straight way.

Here, the Y-axis movement stage 20 is provided with driving force necessary for a Y-axis movement through magnetic force generated by a connection between the magnetic force generator 40 and a first central unit 21. The specimen transferring part 50 is located on the upper portion of the magnetic force generator 40.

The Y-axis movement stage 20 includes a pair of first supplementary units 23 mounted at both sides of the first central unit 21 centering around the first central unit 21 in parallel to a longitudinal direction of the first central unit 21, the first supplementary units 23 performing a straight movement parallel with the movement direction of the first central unit 21, and a pair of first connection units 24 symmetrically mounted at both sides in a width direction of the first central unit 21.

Furthermore, the Y-axis movement stage 20 includes a pair of first straight springs 21a arranged in a row between the first supplementary units 23 for continuously passing and fixing the first central unit and connecting both sides to the first supplementary units to force the first supplementary units 23 by the motion of the first central unit 21, and a pair of first supplementary straight springs 23a connected between the both sides of the first supplementary units 23 in parallel with the first straight springs 21a.

At this time, the specimen transferring part 50 has a pair of connecting members 51 extending—Z-direction from both sides and being bent inwardly. The connecting members 51 are fit into the first connection units 24 from the outer wall to the inside of the lower portion. As the result, the connection members 51 are connected to the Y-axis movement stage 20, and a yoke 41 of the magnetic force generator 40, which will be explained later, is fit into a first hole 52 formed in the bottom of the specimen transferring part 50.

Figure 7:
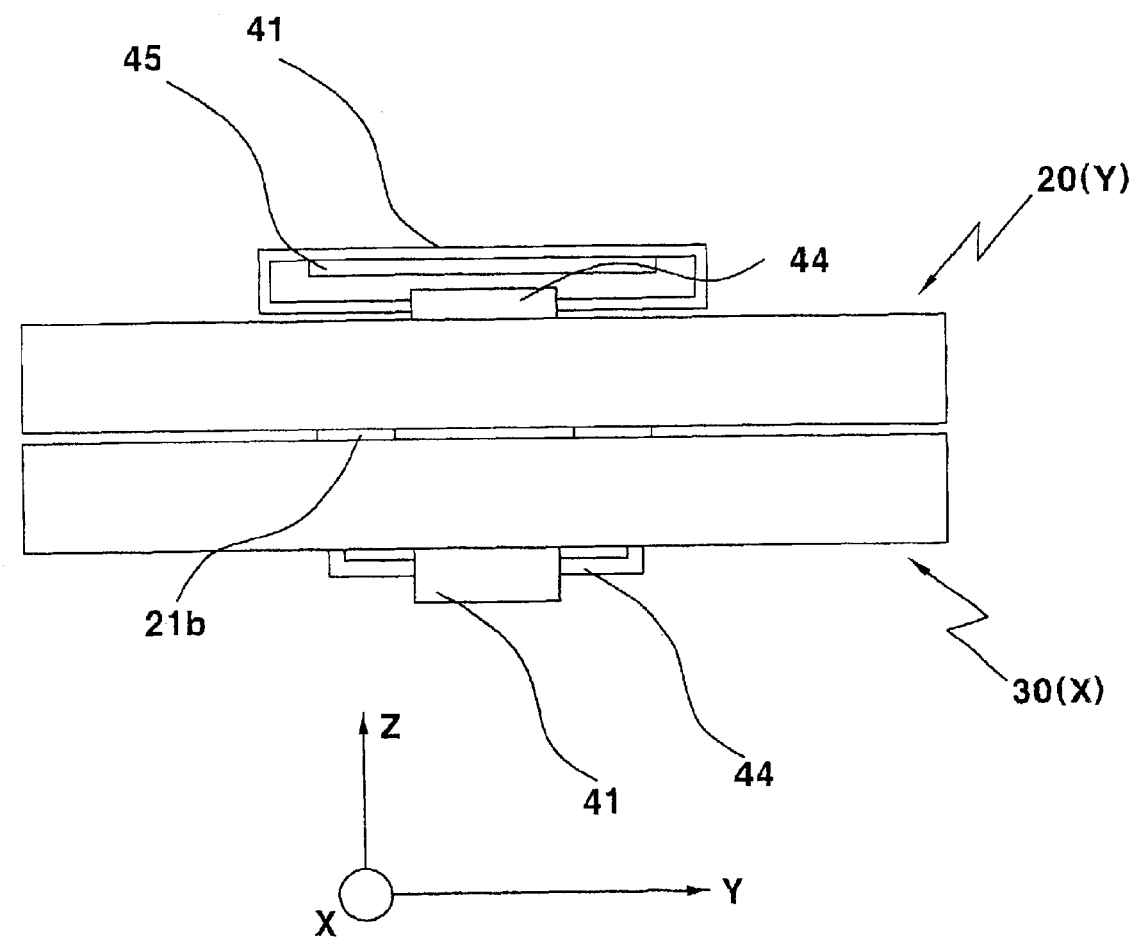
FIG. 7 is a side view of the apparatus for precisely driving X-Y stages using the VCM according to the first preferred embodiment of the present invention.

The X-axis movement stage 30 is connected in a built-up connecting way that the lower portions of the stages 20 and 30 are contacted with each other and cross at a right angle to each other. Namely, as shown in FIG. 7, the X-axis and Y-axis movement stages 30 are orthogonally stacked to each other so that each movement direction of the stages 30 and 20 are to be cross. At this time, the magnetic force generator 40 is connected to a second central unit 31 by a coil 44. When electric current is applied to the coil 44, the second central unit 31 performs the straight movement while moving in an X-axis direction to the Y-axis movement stage 20.

The X-axis movement stage 30 has the same structure as the Y-axis movement stage 20, and includes the second central unit 31 located at the center, a pair of supplementary units 33 mounted at both sides of the second central unit 31 centering around the second central unit 31 in parallel with a longitudinal direction of the second central unit 31, the first supplementary units 33 performing a straight movement parallel with a movement direction of the second central unit 31, and a pair of second connection units 34 symmetrically mounted at both sides in a width direction of the second central unit 31.

Furthermore, the X-axis movement stage 30 includes a pair of second straight springs 31a arranged in a row between the second supplementary units 33 for continuously passing and fixing the second central unit 31 and connecting both sides to the second supplementary units 33 to force the second supplementary units 33 by the motion of the second central unit 31, and a pair of second supplementary straight springs 33a connected between the both sides of the second supplementary units 33 in parallel with the second straight springs 31a.

The magnetic force generator 40 mounted to provide the stages 20 and 30 with driving force includes the yoke 41, a permanent magnet 45 connected inside the yoke 41 and moving integrally, and the coil 44 generating magnetic force in a vertical direction to flux of the permanent magnet 45. Strength of the magnetic force is proportional to a flow density of magnetic force generated from the permanent magnet 45 of the magnetic force generator 40, a length, the wound number and a size of electric current of the coil 44.

At this time, the yoke 41 links the flux between the permanent magnet 45 and the coil 44, and the coil 44 is wholly wound on the first and second units 21 and 31 of each stage, so that the coil 44 can be moved with the central units 21 and 31 relatively to the yoke 41 and the permanent magnet 45.

Moreover, the Y-axis movement stage 20 has two pairs of legs 21b and a pair of stepped jaw parts 22c symmetrically mounted with each other on the lower portion of the first central unit 21 in a—Z-direction along a height of the first central unit 21. The legs 21b are fit into holes 31b formed along a height of the second central unit 31.

Each stepped jaw part 22c is to isolate the stages 20 and 30 to a predetermined height to prevent interference in movement of the Y-axis movement stage 20 by the X-axis movement stage 30, and the lower portion of the jaw part 22c is in a close contact with the lower portion of the second central unit 31.

As described above, the Y-axis movement stage 20 and the X-axis movement stage 30 have a two-stage connection structure mounted on the lower part of the stage base 10. At this time, the yoke 41 of the magnetic force generator 40 of the X-axis movement stage 30 is connected to a second hole 11 formed in the lower surface of the stage base 10, and the Y-axis movement stage 20 is laid on the X-axis movement stage 30. Therefore, the Y-axis movement stage 20 and the X-axis movement stage 30 are enclosed in the stage base 10.

The stage base 10 is a housing in the form of a hexahedron opened at the upper part, and the upper portion of each side of the stage base 10 has a sensor groove 12 at the center for mounting a sensor. The sensor is constant-current type sensor or interferometer, and is electrically connected to a controller to send a transferred level of the sensed specimen transferring part 50 to the controller.

Therefore, the controller measures displacement of the specimen transferring part 50 based on sensing signal of each sensor, and controls a current amount applied to the coil 44 of the magnetic force generator 40 according to the measured displacement amount.

A motion relationship according to current application to the coil 44 by the stages 20 and 30 will be described as follows.

When electric current is applied to the coil 44 of the magnetic force generator 40 mounted on the Y-axis movement stage 20, the coil 44 and the first central unit 21 are fixed, and the yoke 41 and the permanent magnet 45 are moved relatively. As the result, the specimen transferring part 50 located on the upper portion of the yoke 41 and the first connection units 24 connected to the legs 51 of the specimen transferring part 50 are moved in the Y-axis direction integrally.

When electric current is applied to the coil 44 of the X-axis movement stage 30, because the yoke 41 is fit into the second groove 11 of the stage base 10, the coil 44 and the second central unit 31 connected to the coil 44 are driven relatively, and at this time, also the entire Y-axis movement stage 20 is driven. As the result, the specimen transferring part 50 is moved in the X-axis direction.

As described above, the stages 20 and 30 are driven by the relatively driving principle of the magnetic force generator 40 that a non-fixed part is operated in relation to a selectively fixed part according to the Lorentz law that magnetic force is generated at a right angle to a direction of flux and a direction of current flow. It is possible that the specimen transferring part 50 can be displaced selectively in the X-axis direction or the Y-axis direction by mutually magnetic restriction between the coil 44 and the permanent magnet 45.

Figure 8:
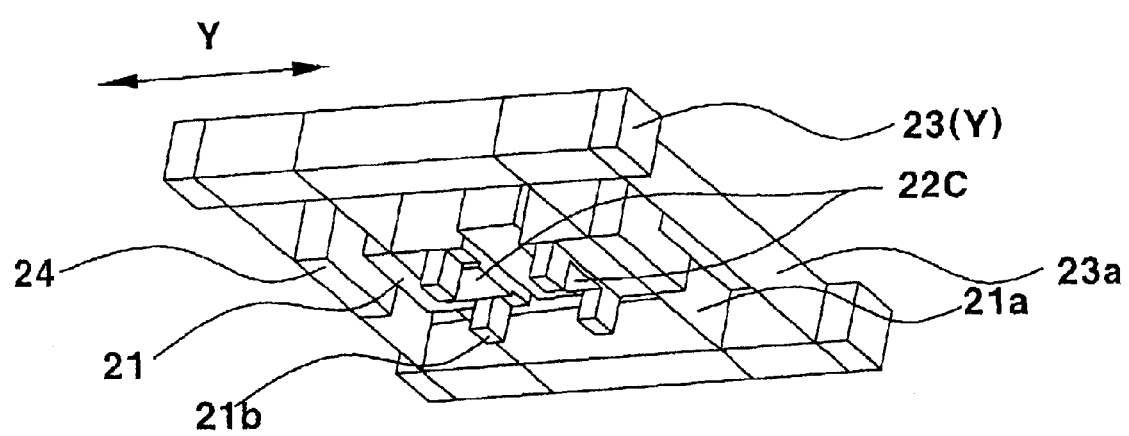
FIG. 8 is a perspective view of the Y-axis movement stage according to the first embodiment of the present invention.

FIG. 8 is a perspective view of the Y-axis movement stage according to a first preferred embodiment of the present invention.

The Y-axis movement stage 20 includes the first central unit 21, a pair of the first supplementary units 23 arranged at both sides in parallel with the first central unit 21, a pair of the first straight springs 21a arranged in a row, passing the first central unit 21 at a right angle and having both sides connected to the first supplementary units 23, a pair of the first supplementary straight springs 23a connected between the both sides of the first supplementary units 23 to be located between the first straight springs 21a, and a pair of the first connection units 24 passing the central portion of the first supplementary straight springs 23a.

Here, the first central unit 21 is moved according to strength generated by the magnetic force generator 40 connected to the upper portion. At this time, the first central unit 21 reciprocates in inverse proportion to elastic repulsive force of the first straight springs 21a passing in parallel at the both sides of the first central unit 21.

The magnetic force generated from the magnetic force generator 40 is transmitted to the first supplementary units 23 through the first central unit 21 by half.

The first straight springs 21a and the first supplementary straight springs 23a serve to guide relatively according to the reciprocating motion of the Y-axis movement stage 20 and to transfer strength.

Furthermore, the first straight springs 21a and the first supplementary straight springs 23a serve to reciprocate smoothly, in spite of a small power, using repulsive force due to elastic strength according to the reciprocating motion of the Y-axis movement stage 20.

The above movement means the Y-axis movement, but may cause movement in the X-axis direction or a Z-axis direction.

At this time, the Y-axis movement can be performed smoothly because it trends to move in a vertical direction to a side surface of the first straight springs and the first supplementary straight springs, but the X-axis movement or the Z-axis movement is prevented by a stronger elastic force than the Y-axis movement because being performed along a longitudinal direction or a width direction of the first straight springs and the first supplementary straight springs.

Therefore, the X-axis movement or the Z-axis movement has little or weak motion.

Figure 9:
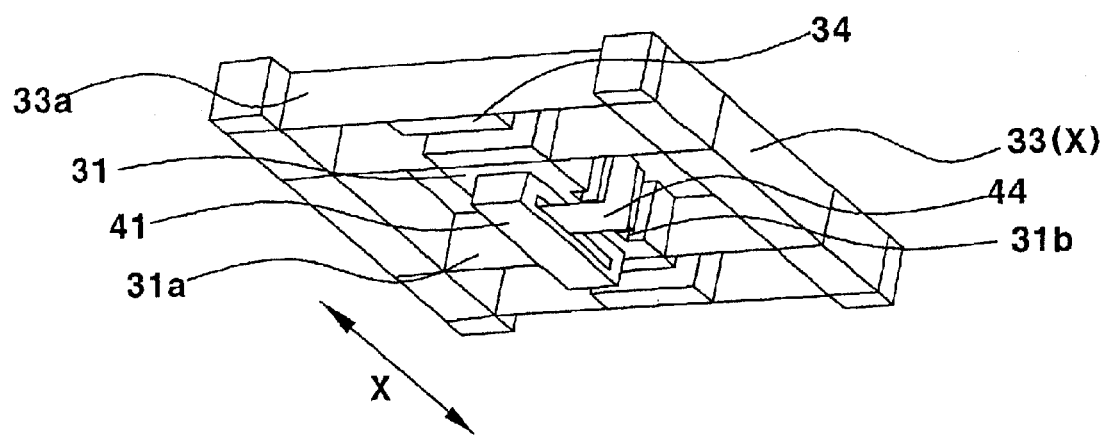
FIG. 9 is a perspective view of the X-axis movement stage according to the first embodiment of the present invention.
Figure 10:
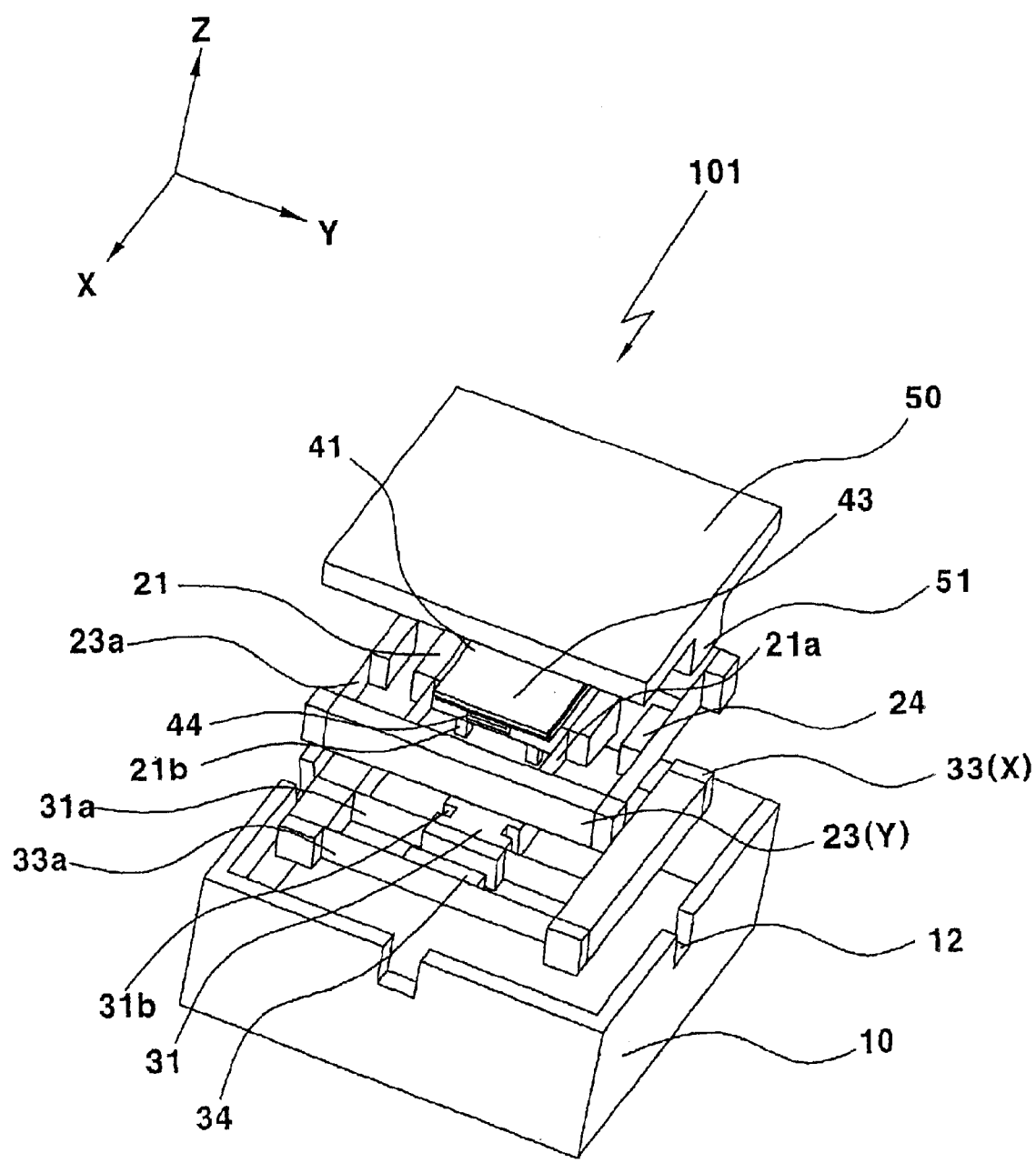
FIG. 10 is a first exploded perspective view of an apparatus for precisely driving X-Y stages using a VCM according to a second preferred embodiment of the present invention.
Figure 11:
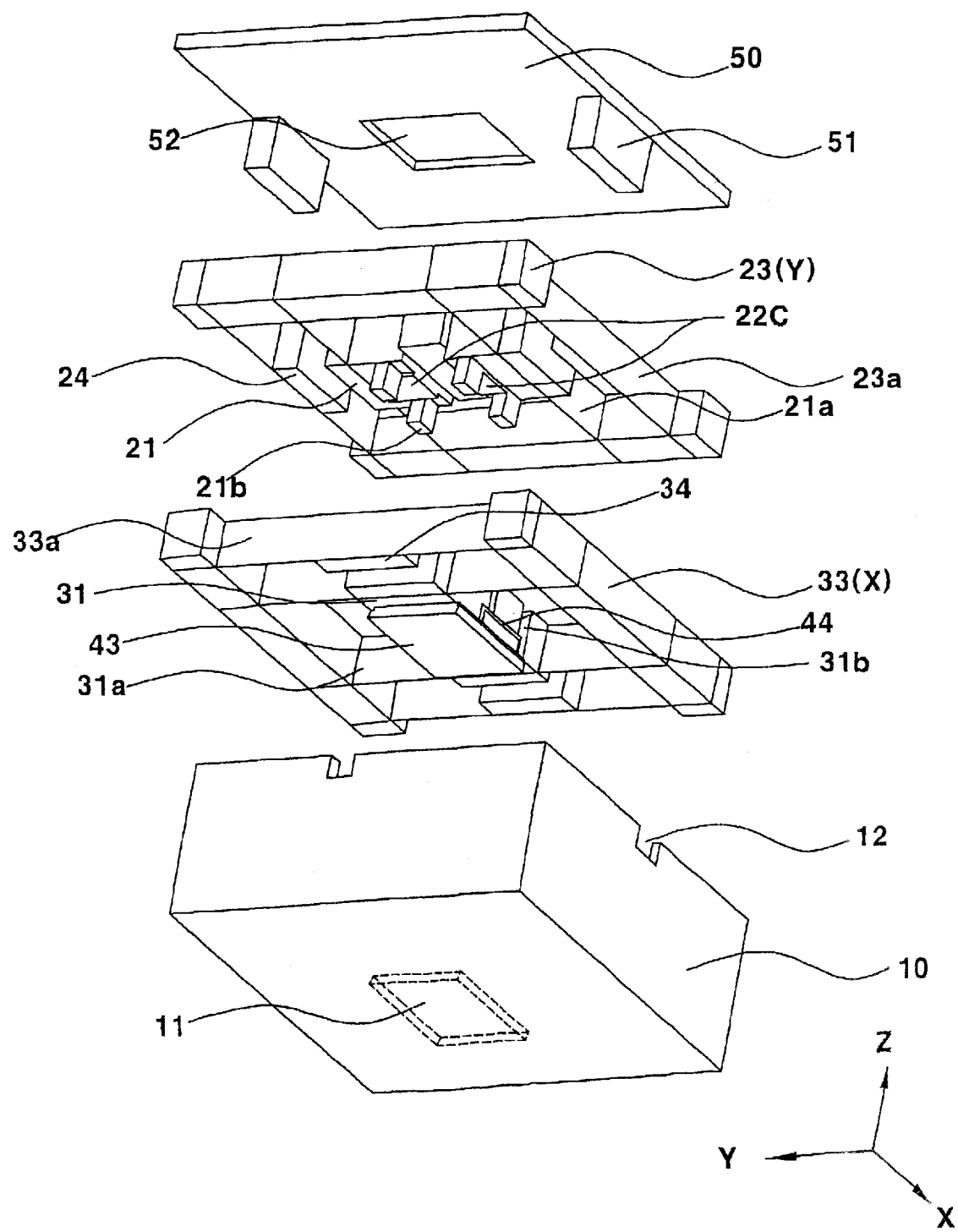
FIG. 11 is a second exploded perspective view of the apparatus for precisely driving X-Y stages using the VCM according to the second preferred embodiment of the present invention.
Figure 12:
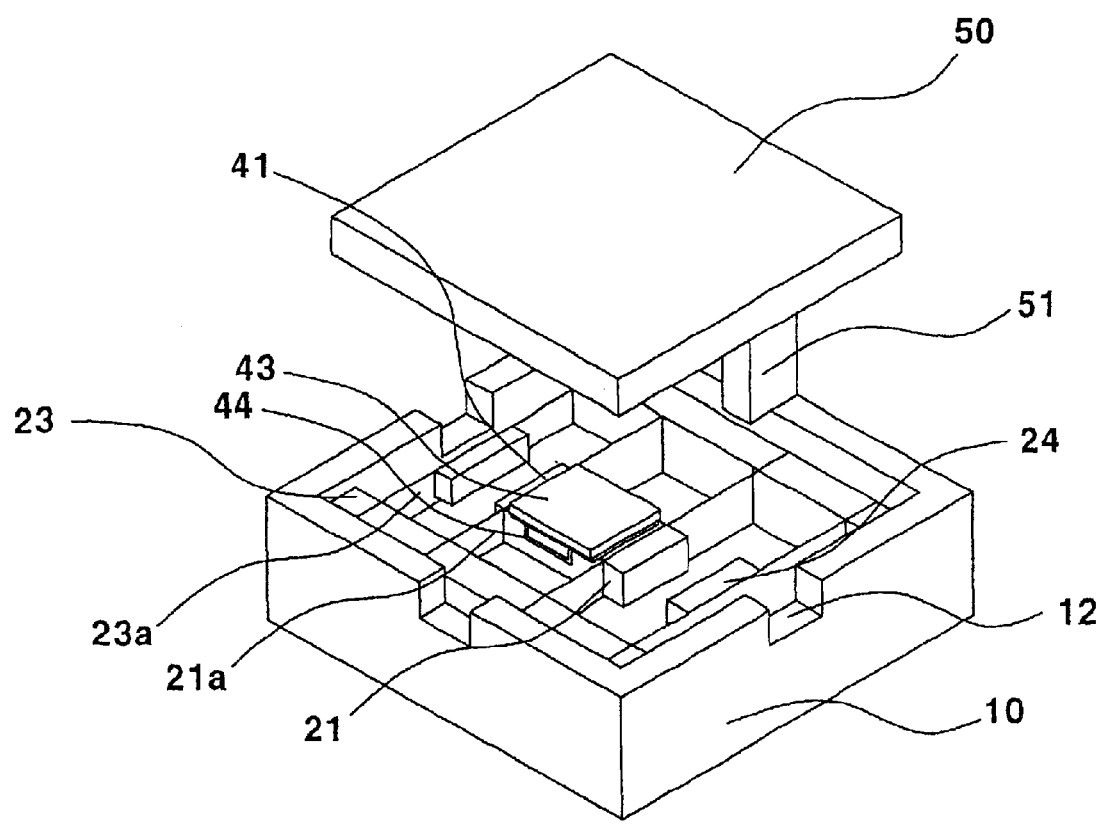
FIG. 12 is a third exploded perspective view of the apparatus for precisely driving X-Y stages using the VCM according to the second preferred embodiment of the present invention.

FIG. 9 is a perspective view of the X-axis movement stage according to the first preferred embodiment of the present invention.

The X-axis movement stage 30 includes a pair of the second supplementary units 33 mounted at the both sides of the second central unit 31 centering around the second central unit 31 in parallel with the longitudinal direction of the second central unit 31, the second supplementary units 33 performing a straight movement in parallel with a movement direction of the second central unit 31, and a pair of the second connection units 34 mounted at the both sides symmetrically in the width direction of the second central unit 31.

A second preferred embodiment has X and Y axis stages of the same structure like the first preferred embodiment, and so, it will be described in brief.

As shown in FIGS. 10 to 12 and FIGS. 13A and 13B, the apparatus 101 for precisely driving Y-Y stages using a VCM includes a magnetic force generator 40 for generating magnetic force when electric current is applied thereto, a Y-axis movement stage 20 for reciprocating axially by the magnetic force generator 40 connected to the upper portion of a first central unit 21, an X-axis movement stage 30 connected at a right angle to the lower portion of the Y-axis movement stage 20, a specimen transferring part 50 fixed to first connection units 24 of the Y-axis movement stage 20, and a stage base 10 of a hexahedral shape opened at the upper part for inserting the assembled stages 20 and 30.

Figure 13A:
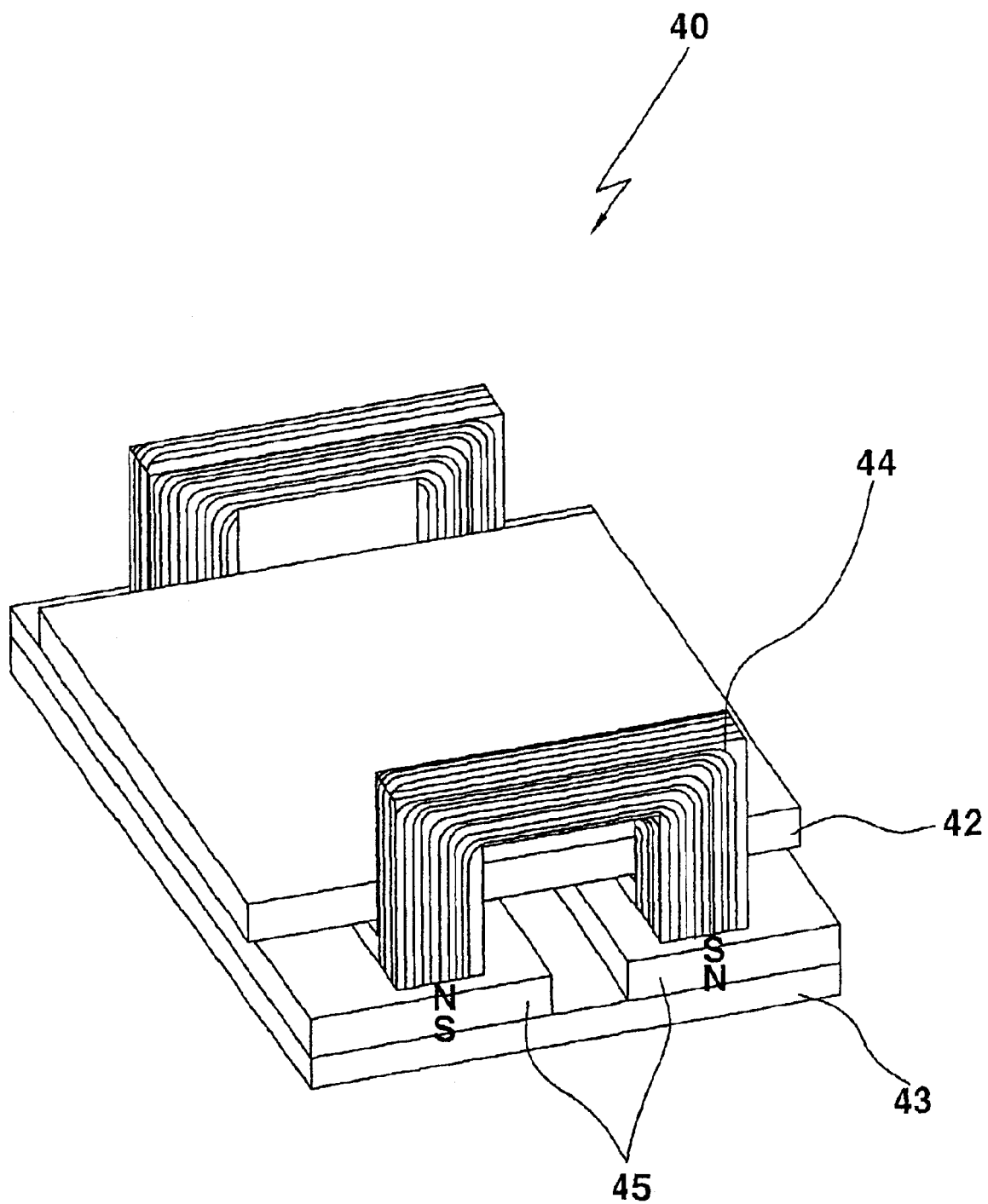
FIG. 13A is a structural view of a second magnetic force generator according to the second embodiment of the present invention.

Here, as shown in FIG. 13A, the magnetic force generator 40 includes a coil 44 connected to both sides of the first central unit 21 and a second central unit 31 for generating magnetic force according to applied current, a pair of permanent magnets 45 having different poles and being connected to the upper portion of the coil 44 at a predetermined interval for generating flux at a right angle to a direction of magnetic force of the coil 44, a first yoke 42 connected to the lower portion of the coil 44 and having the lower portion connected to the upper surfaces of the first central unit 21 and the second central unit 31, and a second yoke 43 connected to the upper parts of the permanent magnets 45 and linking the flux of the permanent magnets 45 together with the first yoke 42 to induce generation of relative magnetic force between the permanent magnets 45 and the coil 44.

Here, the coil 44 of the magnetic force generator 40 is in the form of a rectangular ring to circulate the applied current in one direction, and has ends bent Z-direction at an angle of 90 degrees to be coupled to the first and second central units 21 and 31 of the stages 20 and 30.

The permanent magnets 45 of different poles are laid up on the both sides of the upper portion of the coil 44 to move electric current in one direction.

At this time, the first and second yokes 42 and 43 are laid up on the lower portion of the coil 44 or the upper portion of the permanent magnets 45 to circulate electric current smoothly. Here, the coil 44 is laid between the first and second yokes 42 and 43

Because the magnetic force generator 40 (coil and first and second yokes 44 and 42) is connected to the first central unit 21 of the Y-axis movement stage 20 and has the coil bent—Z-directionally at the angle of 90 degrees at both ends, it is fit to a side of the first central unit 21, and the first yoke 42 located on the lower portion of the coil 44 is also fixed.

Furthermore, the magnetic force generator 40 is connected to the upper portion of the second central unit 31 of the X-axis movement stage 30. The coil 44 of the magnetic force generator 40 is connected to a side of the second central unit 31, and the first yoke 42 located on the lower portion of the coil 44 is also fixed.

Meanwhile, a motion relationship according to current application to the coil 44 by the stages 20 and 30 will be described as follows.

When electric current is applied to the coil 44 of the magnetic force generator 40 mounted on the Y-axis movement stage 20, the first yoke 42, the coil 44 and the first central unit 21 are fixed, and the second yoke 43 and the permanent magnets 45 are moved relatively. As the result, the specimen transferring part 50 located on the upper portion of the second yoke 43 and the first connection units 24 connected to the connecting members 51 of the specimen transferring part 50 are moved in the Y-axis direction integrally.

When electric current is applied to the coil 44 of the X-axis movement stage 30, because the second yoke 43 is fit into the second groove 11 of the stage base 10, the first yoke 42, the coil 44 and the second central unit 31 connected to the coil 44 are driven, and at this time, also the entire Y-axis movement stage 20 is driven. As the result, the specimen transferring part 50 is moved in the X-axis direction.

As described above, the stages 20 and 30 are driven by the relatively driving principle of the magnetic force generator 40 that a non-fixed part is operated in relation to a selectively fixed part according to the Lorentz law that magnetic force is generated at a right angle to a direction of flux and a direction of current flow. It is possible that the specimen transferring part 50 can be displaced selectively in the X-axis direction or the Y-axis direction by mutually magnetic restriction between the coil 44 and the permanent magnet 45.

Figure 13B:
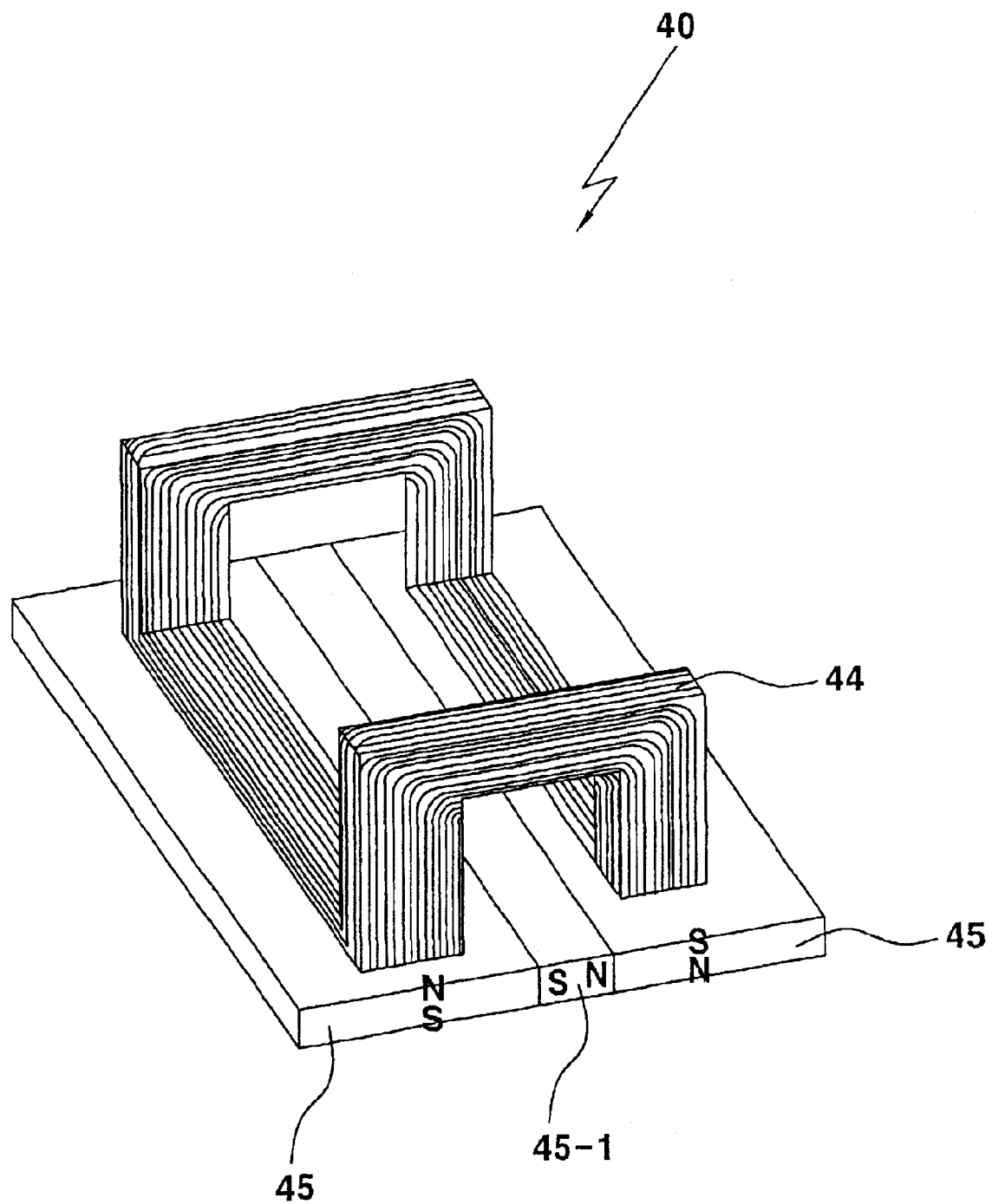
FIG. 13B is a structural view of a third magnetic force generator according to the second embodiment of the present invention, which modified from FIG. 13A.
Figure 14:
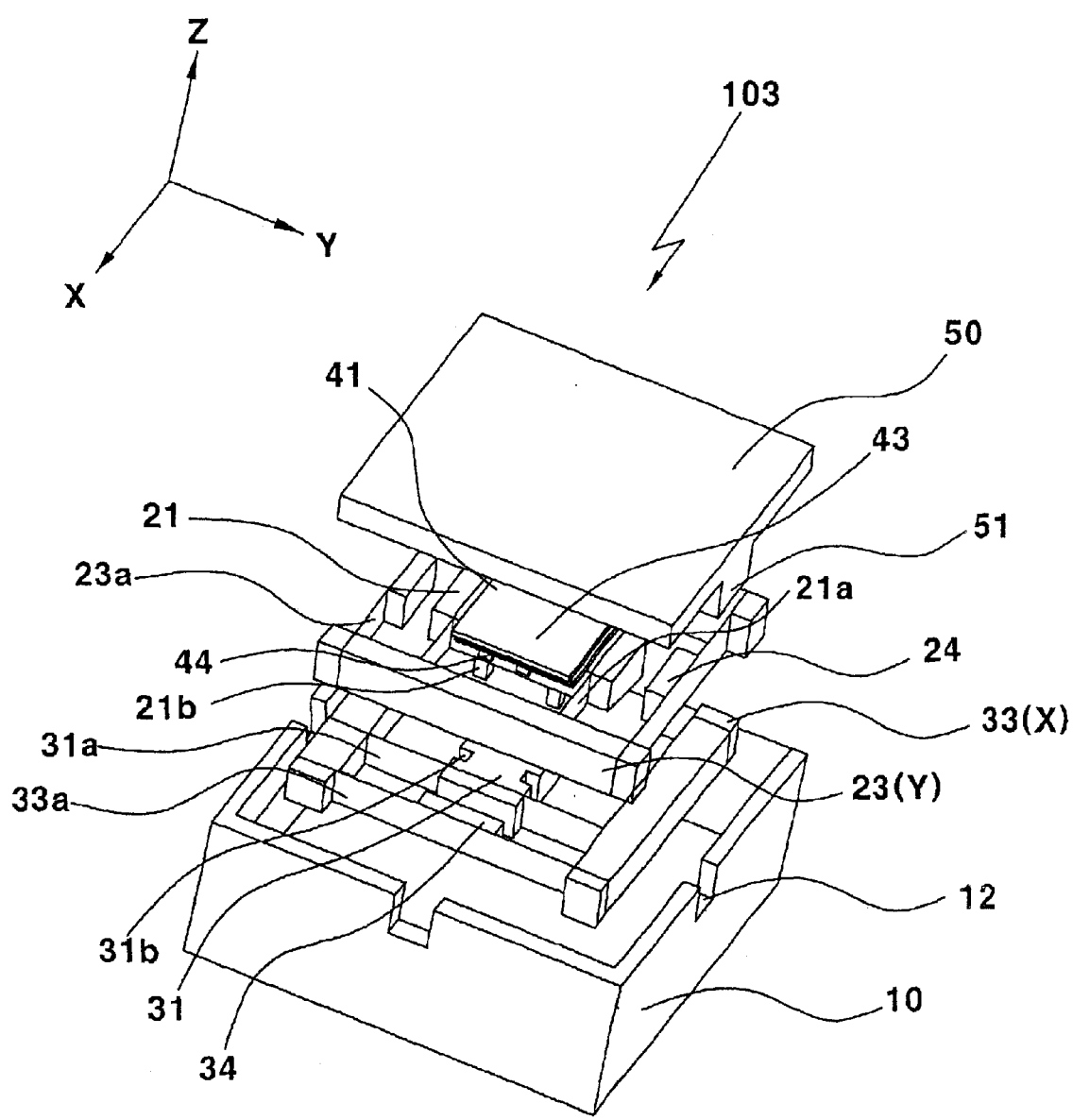
FIG. 14 is a first exploded perspective view of an apparatus for precisely driving X-Y stages using a VCM according to a third preferred embodiment of the present invention.
Figure 15:
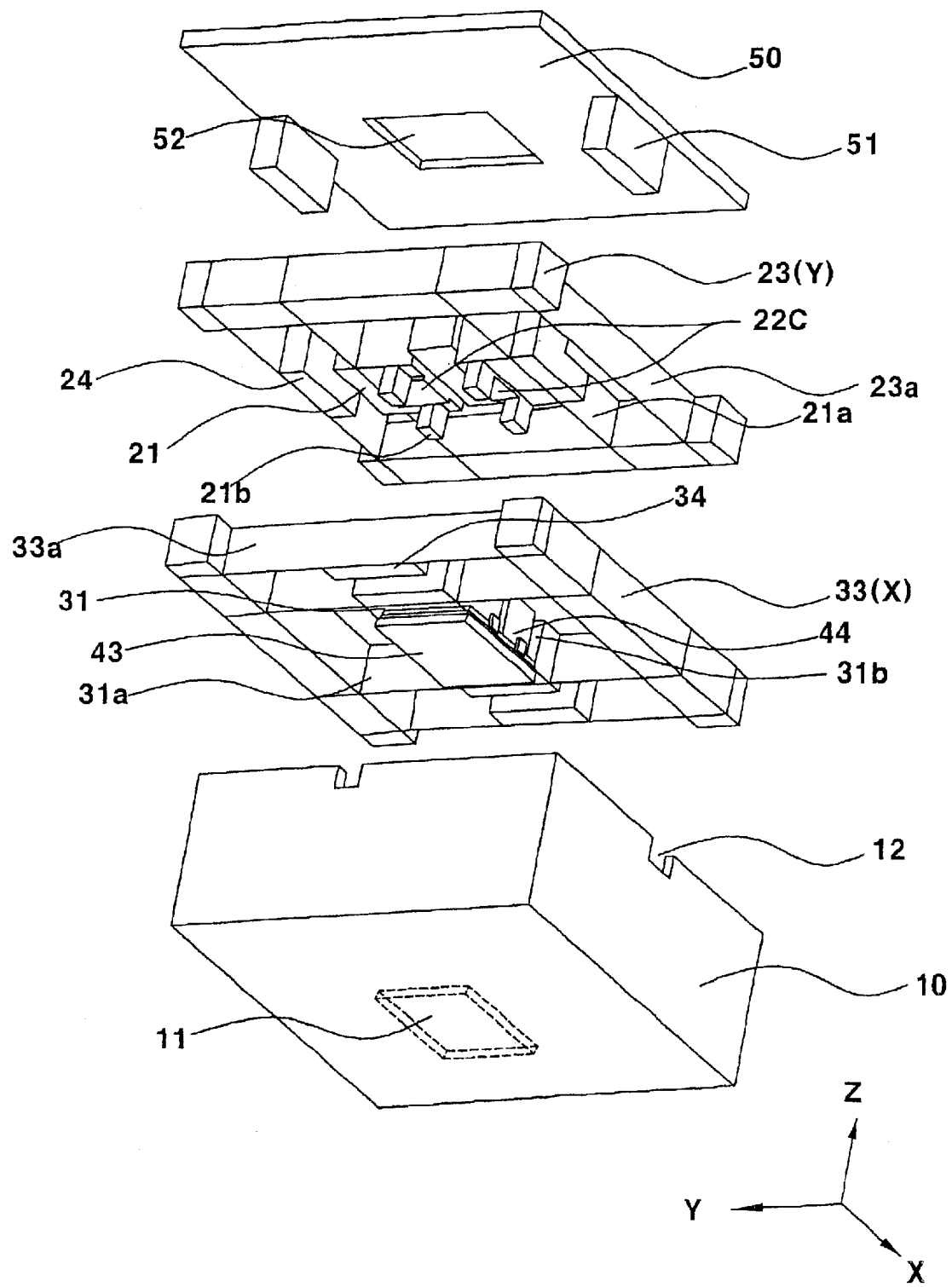
FIG. 15 is a second exploded perspective view of the apparatus for precisely driving X-Y stages using the VCM according to the third preferred embodiment of the present invention.
Figure 16:
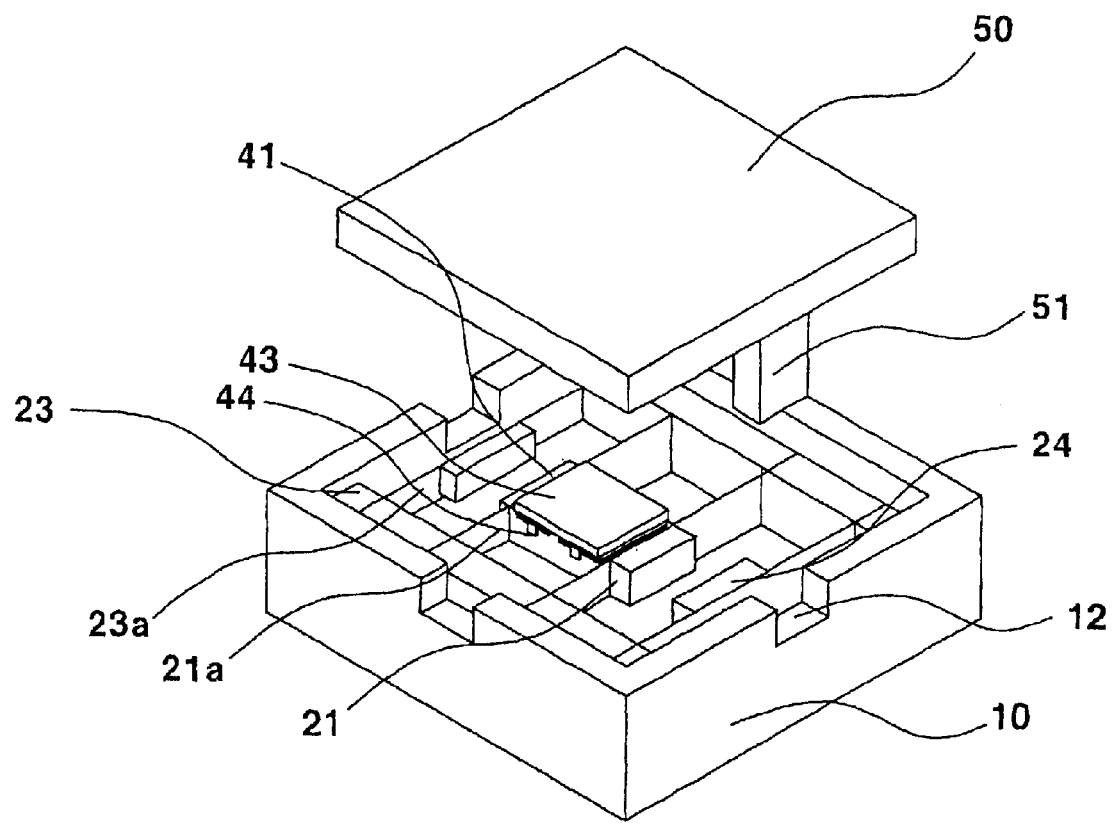
FIG. 16 is a third exploded perspective view of the apparatus for precisely driving X-Y stages using the VCM according to the third preferred embodiment of the present invention.

Meanwhile, as shown in FIG. 13B, the magnetic force generator 40 can be modified to show the same performance of that of FIG. 13A and to allow the apparatus to implement in a relatively small volume (or compact sized) as the yokes 42 and 43 are removed from the alignment of FIG. 13A and instead, a permanent magnet 45-1 is installed between the pair of the permanent magnets 45. Here, the pole direction of the permanent magnet 45-1 is aligned to enhance the magnetic flux of the permanent magnets 45.

Therefore, the modified magnetic force generating unit 40 of FIG. 13B allows the apparatus 102 to reduce its weight and volume.

A third preferred embodiment has X and Y axis stages of the same structure as the first preferred embodiment, and so, it will be described in brief.

As shown in FIGS. 14 to 17, the apparatus 103 for precisely driving X-Y stages using VCM includes X- and Y-axis stages 30 and 20 of the same structure, each of which has a part driving on both fixed sides and a part connected to the driving part by an elastic member and driving in the same direction as the driving part, and magnetic force generators 40 connected to the stages 20 and 30 respectively for providing the stages 20 and 30 with driving force.

A specimen transferring part 50 is connected to the upper portion of the Y-axis movement stage 20, and the X-axis movement stage 30 is mounted inside a stage base 10 being in the form of a container. At this time, the stages 20 and 30 are laid up across each other, so that electric current is selectively applied to the magnetic force generators 40 to transfer the specimen transferring part 50 to an X-axis or a Y-axis in a straight way.

Here, the Y-axis movement stage 20 is provided with driving force necessary for a Y-axis movement through magnetic force generated by a connection between the magnetic force generator 40 and a first central unit 21. The specimen transferring part 50 is located on the upper portion of the magnetic force generator 40.

Figure 17A:
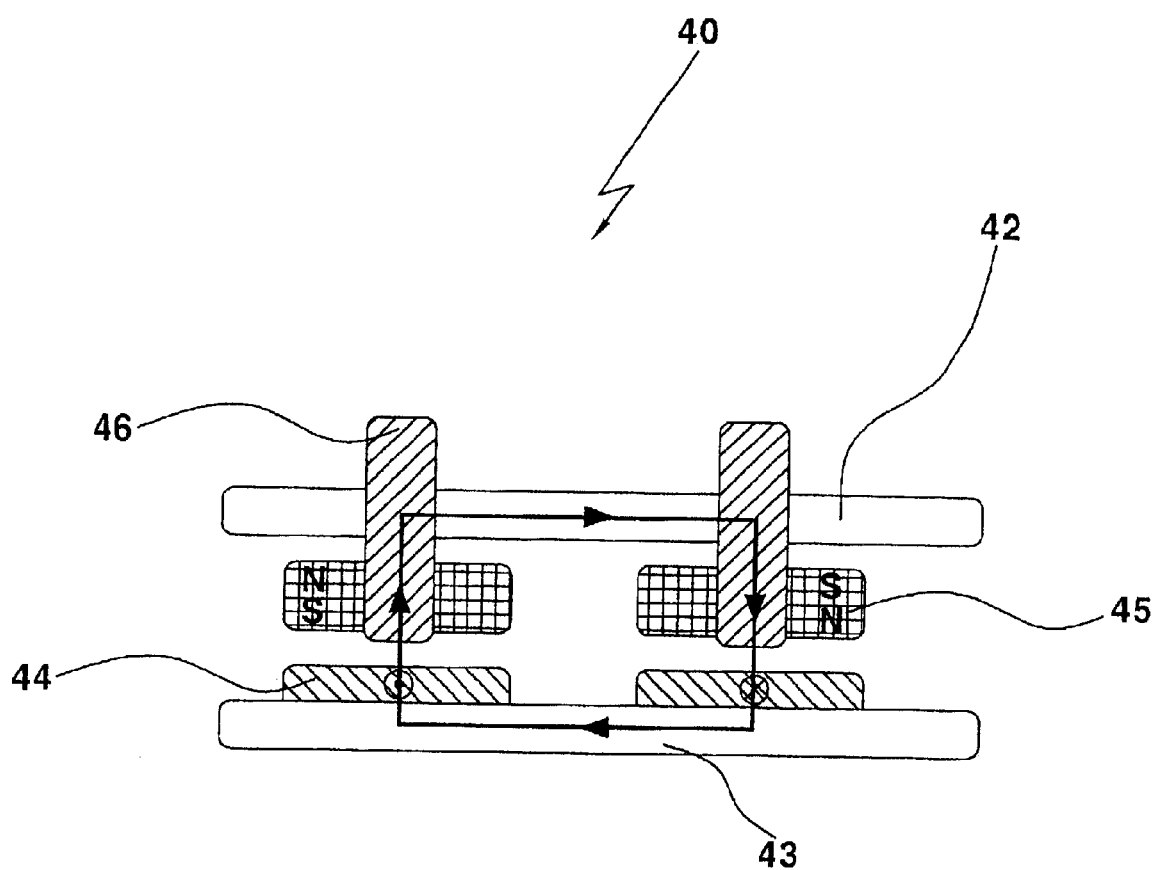
FIG. 17A is a structural view of a fourth magnetic force generator according to the third embodiment of the present invention.

Here, as shown in FIG. 17A, the magnetic force generator 40 includes a first yoke 42 connected with a first central unit 21 and a second central unit 31 at the lower portion, a connection bar 45 crossing a side surface of the first yoke 42 and having an end connected with the first and second central units 21 and 31 and the other end having a side to which a pair of permanent magnets 45 of different poles are connected, a coil 44 located on the upper portion of the permanent magnets 45 for generating magnetic force at a right angle to a flux direction of the permanent magnets 45 through the applied electric current, and a second yoke 43 located on the upper portion of the coil 44 for linking flux of the permanent magnets 45 together with the first yoke 42 to induce generation of relative magnetic force between the coil 44 and the permanent magnets 45.

Additionally, the coil 44 of the magnetic force generator 40 is in the form of a rectangular ring to circulate the applied current in one direction, the second yoke 43 is located on the upper portion of the coil 44, and the permanent magnets 45 of different poles are located on the lower portion of the coil 44.

At this time, two pairs of the connection bars 46 are mounted Z-directionally at both sides of the permanent magnets 45, crossing the side surface of the first yoke 42 in the Z-direction.

Ends of the connection bars 46 are connected to the sides of the first and second central units 21 and 31 after crossing the side of the first yoke 42, and the other ends of the connection bars 46 are connected to the sides of the permanent magnets 45.

Meanwhile, a motion relationship according to current application to the coil 44 by each stage will be described as follows.

When electric current is applied to the coil 44 of the magnetic force generator 40 mounted on the Y-axis movement stage 20, the first yoke 42, the permanent magnets 45 fixed by the connection bars 46 and the first central unit 21 are fixed, and the second yoke 43 and the coil 44 are moved relatively. As the result, the specimen transferring part 50 located on the upper portion of the second yoke 43 and the first connection units 24 connected to legs of the specimen transferring part 50 are moved in the Y-axis direction integrally.

When electric current is applied to the coil 44 of the X-axis movement stage 30, because the second yoke 43 is fit into the second groove 11 of the stage base 10, the first yoke 42, the permanent magnets 45 fixed by the connection bars 46 and the first central unit 21 connected to the coil 44 are driven, and at this time, also the whole of the Y-axis movement stage 20 is driven. As the result, the specimen transferring part 50 is moved in the X-axis direction.

As described above, the apparatus is driven by the relatively driving principle of the magnetic force generator 40 that a non-fixed part is operated in relation to a selectively fixed part according to the Lorentz law that magnetic force is generated at a right angle to a direction of flux and a direction of current flow. It is possible that the specimen transferring part 50 can be displaced selectively in the X-axis direction or the Y-axis direction by mutually magnetic restriction between the coil 44 and the permanent magnet 45.

The positions of the permanent magnets 45, the coil 44 and the yokes of the magnetic force generator 40 can be changed according to strength of the generated magnetic force.

Figure 17B:
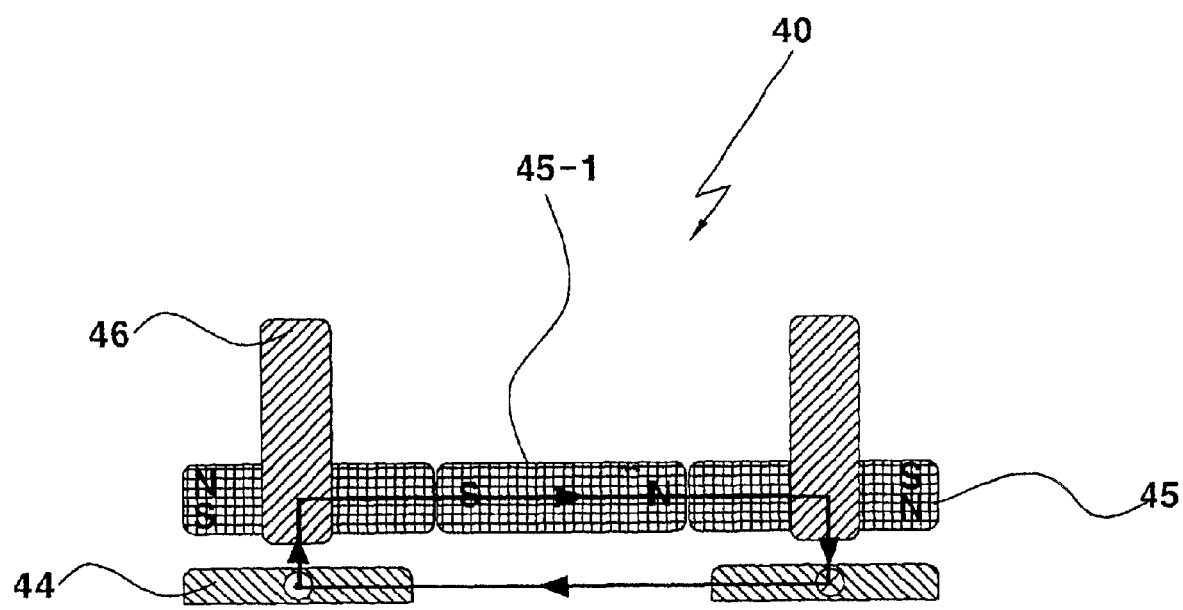
FIG. 17B is a structural view of a fifth magnetic force generator according to the third embodiment of the present invention, which is modified from FIG. 17A.

Meanwhile, as shown in FIG. 17B, the magnetic force generator 40 can be modified to show the same performance of that of FIG. 17A and to allow the apparatus to implement in a relatively small volume (or compact sized) as the yokes 42 and 43 are removed from the alignment of FIG. 17A and instead, a permanent magnet 45-1 is installed between the pair of the permanent magnets 45. Here, the pole direction of the permanent magnet 45-1 is aligned to enhance the magnetic flux of the permanent magnets 45.

Therefore, the modified magnetic force generating unit 40 of FIG. 17B allows the apparatus 103 to reduce its weight and volume.

As described above, the apparatus for precisely driving X-Y stages using the VCM according to the present invention has symmetric straight units, central units, supplementary units and magnetic force generator, and realizes thermal safety, linear movement and safety in movement by laying up the lower portions of the stages in the two-stage structure through a simple arrangement, thereby precisely controlling two-axes positioning of a specimen.

Furthermore, the straight springs serve to precisely move the specimen on a high precision microscope in X-Y axes of a long area because it almost never causes other movements excepting the plane movement.

Moreover, the apparatus can serve as a precisely driving apparatus of a dual driving apparatus having a coarse/micro actuator in various checking equipments for measuring a very long area.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for precisely driving X-Y stages using a VCM (Voice Coil Motor), comprising:
    a stage, which is movable in a first-axis direction with respect to a horizontal plane, including:
        a pair of first connection units connected to both sides of a specimen transferring part reciprocating in the first-axis direction to mount the specimen transferring part on the upper portion of the first connection units, the first connection units moving together with the specimen transferring unit;
        a first central unit located between the first connection units;
        a pair of first supplementary units arranged on both sides of the first central unit in an axial direction in parallel with each other, the pair of first supplementary units supplementing the first central unit;
        a pair of first straight springs arranged in a row, both sides of the first straight springs being connected between the first supplementary units, the first central unit passing the first straight springs continuously and being fixed to the first straight springs; and
        a pair of first supplementary straight springs connected to both sides of the first supplementary units in parallel to each other, the first supplementary straight springs being symmetric from the first straight springs, each first connection unit passing the first supplementary straight spring and being fixed to the first supplementary straight spring;
    a stage, which is movable in a second-axis direction orthogonal to the first-axis direction with respect to the horizontal plane correspondingly connected to the lower portion of the first-axis direction movement stage, the second-axis direction movement stage including:

a second central unit reciprocating in the second-axis direction;

a pair of second supplementary units arranged at both sides symmetrically to each other in parallel to a movement direction of the second central unit, the pair of second supplementary units supplementing the second central unit;

a pair of second straight springs arranged in a row between the second supplementary units, the first central unit passing the second straight springs continuously and being fixed to the second straight springs;

a pair of supplementary straight springs connected at both sides of the Second supplementary units in a row, the supplementary straight springs being symmetric from the second straight springs; and a pair of second connection units passing the central portions of the second supplementary straight springs and being fixed to the second supplementary straight springs, wherein the first central unit and the second central unit are crossed at an angle of 90 degrees;

a stage base configured in the form of a hexahedron opened at the upper end, wherein the second-axis movement stage is seated on the inside bottom of the stage base by the second connection units fixed to the inside; and a pair of magnetic force generators respectively connected to the first central unit and the second central unit for selectively forcing the second-axis direction movement or the first direction movement in mutual symmetry through a magnetic restriction, so that the specimen transferring part is moved in the first direction to the first central unit and the second central unit is moved in the second-axis direction to the second connection units.

2. The apparatus according to claim 1, wherein the magnetic force generator includes:

a coil wound on the entire first and second central units for generating magnetic force according to applied electric current;

a permanent magnet magnetically corresponding to the coil for emitting flux at a right angle to the magnetic force direction of the coil; and a yoke having an inner part to which the permanent magnet is connected and fixed.

3. The apparatus according to claim 1, wherein the magnetic force generator includes:

a coil connected to both sides of the first and second central units for generating magnetic force according to applied electric current;

a pair of permanent magnets connected to the upper portion of the coil, the permanent magnets having different poles from each other and being arranged at a regular interval for emitting flux at a right angle to the magnetic force direction of the coil;

a first yoke connected to the lower portion of the coil, the lower portion of the first yoke being connected to the upper surfaces of the first and second central units; and a second yoke fixed to the whole upper portions of the permanent magnets, the second yoke linking the flux of the permanent magnets together with the first yoke to induce generation of relative magnetic force between the permanent magnets and the coil.

4. The apparatus according to claim 1, wherein the magnetic force generator includes:

a first yoke having the lower portion to which the first and second central units are connected;

connection bars located across the side surface of the first yoke, the connection bars having an end connected to the first and second central units and the other end fixed to sides of the pair of the permanent magnets of different poles, the permanent magnets being arranged at a regular interval;

a coil located on the upper portion of the permanent magnet, the coil for generating magnetic force at a right angle to the flux direction of the permanent magnets through applied electric current; and a second yoke located on the upper portion of the coil, the second yoke linking flux of the permanent magnets together with the first yoke to induce generation of a relative magnetic force between the coil and the permanent magnets.

5. The apparatus according to claim 1, wherein the first-axis movement stage further includes two pairs of legs formed on the lower portion of the first central unit, the legs being fit into two pairs of holes formed in the sides of the second central unit of the second-axis movement stage in a vertical direction to be laid up and connected by the second-axis movement stage.

6. The apparatus according to claim 1, wherein the first central unit includes a pair of stepped jaw parts for isolating the first-axis movement stage from the second-axis movement stage to a predetermined height to prevent interference of the movement of the first-axis movement stage by the first-axis movement stage.

7. The apparatus according to claim 1, wherein two pairs of sensor grooves are formed in upper borders of sides of the stage base to mount sensors on upper borders of sides of the stage base, the sensors sensing displacement of the specimen transferring part.

8. An apparatus for precisely driving X-Y stages using a VCM (Voice Coil Motor), comprising:

(a) a frame having a bottom with a predetermined size and shape and side walls surrounding the bottom with a predetermined height;

(b) a first stage movable in a first direction with respect to a horizontal plane, including:
a first magnet assembly fixed on a bottom of the frame;
a first force generating unit movably connected to the first magnet assembly, wherein the first force generating unit moves in the first direction with respect to the first magnet assembly according to a first current applying thereto; and
first elastic members guiding the first force generating unit to the first direction and returning its normal position, the elastic members are fixed to the first force generating unit;

(c) a second stage movable in a second direction orthogonal to the first direction with respect to the horizontal plane, including:
a second force generating unit fixedly installed onto the first force generating unit, where the second force generating unit is aligned to move orthogonally to the movement direction of the first force generating unit;
a second magnet assembly movably connected to the second force generating unit, the second magnet assembly moves in the second direction with respect to the second force generating unit according to a second current applying thereto; and
second elastic members guiding the second force generating unit to the first direction and returning its normal position with respect to the second magnet relatively moving to the second force generating unit; and (d) a specimen transferring part fixedly installed to the second magnet.

9. The apparatus according to claim 8, wherein said first magnet assembly includes:
a first yoke fixed to the bottom of the frame; and
a first magnet installed within the first yoke.

10. The apparatus according to claim 9, wherein said first force generating unit includes:
a first central unit connected to the first elastic members; and
first coils wound on the first central unit generating a first magnetic flux according to the first current applying thereto, where the first coils pass through the first yoke and in the first direction according to the first current applying thereto.

11. The apparatus according to claim 10, wherein said second force generating unit includes:
a second central unit connected to the second elastic members; and
second coils wound on the second central unit generating a second magnetic flux according to the second current applying thereto.

12. The apparatus according to claim 11, wherein said second magnet assembly includes:
a second yoke fixed to the bottom of the specimen part; and
a second magnet installed within the second yoke.

13. The apparatus according to claim 8, wherein said first magnet assembly includes:
a first yoke fixed to the bottom of the frame;
a pair of magnets fixedly installed on the first yoke; and
first coils wound installed together with the pair of magnets for generating the first magnetic flux according to the first current applying thereto.

14. The apparatus according to claim 13, wherein said first force generating unit, includes:
a second yoke movably installed with respect to the magnet assembly; and
a first central unit fixedly installed to the second yoke and connected to the first elastic members.

15. The apparatus according to claim 14, wherein said second force generating unit includes:
a second central unit connected to the second elastic members and stacked onto the first central unit; and
a third yoke fixedly installed to the second central unit.

16. The apparatus according to claim 15, wherein said second magnet assembly includes:
a fourth yoke fixed to the bottom of the specimen transferring part;
a second pair of magnets fixedly installed to the fourth yoke; and
second coils wound installed together with the second pair of magnets for generating the second magnetic flux according to the second current applying thereto.

17. The apparatus according to claim 8, wherein said first magnetic assembly includes:
a first pair of magnets fixedly installed on the bottom of the frame; and
first coils wound installed together with the first pair of magnets for generating the first magnetic flux according to the first current applying thereto.

18. The apparatus according to claim 17, wherein said first force generating unit includes:
a first magnet adjacently installed in a predetermined interval formed by a first pair of magnets; and
a first central unit fixedly installed to the first magnet and connected to the first elastic members.

19. The apparatus according to claim 18, wherein said second force generating unit includes:
a second central unit fixedly installed to the first central unit and connected to the second elastic members; and
a second magnet fixedly installed to the second central unit.

20. The apparatus according to claim 19, wherein said second magnetic assembly includes:
a second pair of magnets fixedly installed to the bottom of the specimen transferring part;
second coils wound installed together with the second pair of magnets for generating the second magnetic flux according to the second current applying thereto.

21. The apparatus according to claim 8, wherein said first magnet assembly includes:
a first yoke fixed to the bottom of the frame; and
first coils wound fixedly installed onto a side of the first yoke.

22. The apparatus according to claim 21, wherein said first force generating unit includes:
a second yoke installed apart from the first yoke within a predetermined interval;
a first pair of magnets between the first and the second yokes, parallel to the first coils;
a first pair of connection bars each of which connects the first pair of magnets to the second yoke; and
a first central unit fixedly installed to the second yoke and connected to the first elastic members.

23. The apparatus according to claim 22, wherein said second force generating unit includes:
a second central unit fixedly installed to the first central unit and connected to the second elastic members;
a third yoke installed to the second central unit;
a second pair of magnets; and
a second pair of connection bars, each of which connects the second pair of magnets to the third yoke.

24. The apparatus according to claim 23, wherein said second magnetic assembly includes:
a fourth yoke fixed to the bottom of the specimen transferring part; and
second coils wound fixedly installed onto a side of the fourth yoke,
wherein the fourth yoke is positioned apart from the third yoke in a predetermined interval, and the second coils are aligned to be parallel to the second pair of magnets.

25. The apparatus according to claim 8, wherein said first magnet assembly includes first coils wound fixedly installed onto the bottom of the frame.

26. The apparatus according to claim 25, wherein said first force generating unit includes:
a first pair of magnets apart from the first coils in a predetermined distance, wherein the first pair of magnets are parallel to the first coils;
a first central unit connected to the first elastic members; and
a first pair of connection bars, each of which connects the first pair of magnets to the first central unit.

27. The apparatus according to claim 26, wherein said second force generating unit includes:
- a second central unit fixedly installed to the first central unit and connected to the second elastic members;
- a second pair of magnets; and
- a second pair of connection bars, each of which connects the second pair of magnets to the second central unit.

28. The apparatus according to claim 27, wherein said second magnetic assembly includes second coils wound fixedly installed onto the bottom of the specimen transferring part, wherein the second coils are parallel to the second pair of magnets.

* * * * *